United States Patent
Ash et al.

(10) Patent No.: US 10,459,307 B2
(45) Date of Patent: Oct. 29, 2019

(54) FLAME RETARDANCY OF ELECTROCHROMIC DEVICES

(71) Applicant: Gentex Corporation, Zeeland, MI (US)

(72) Inventors: Kevin L. Ash, Grand Rapids, MI (US); Gary J. Dozeman, Zeeland, MI (US); Leroy J. Kloeppner, Jenison, MI (US); Michelle Carroll, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 28 days.

(21) Appl. No.: 15/493,768

(22) Filed: Apr. 21, 2017

(65) Prior Publication Data

US 2017/0307952 A1    Oct. 26, 2017

Related U.S. Application Data

(60) Provisional application No. 62/326,369, filed on Apr. 22, 2016.

(51) Int. Cl.

| | | |
|---|---|---|
| *G02F 1/153* | (2006.01) | |
| *G02F 1/161* | (2006.01) | |
| *C08G 18/50* | (2006.01) | |
| *C08G 18/72* | (2006.01) | |
| *C09K 21/08* | (2006.01) | |
| *C09K 21/10* | (2006.01) | |
| *C09K 21/12* | (2006.01) | |
| *C09K 21/14* | (2006.01) | |
| *C08G 18/73* | (2006.01) | |
| *C08G 18/76* | (2006.01) | |
| *C08G 18/79* | (2006.01) | |

(Continued)

(52) U.S. Cl.
CPC ......... *G02F 1/161* (2013.01); *C08G 18/3812* (2013.01); *C08G 18/5015* (2013.01); *C08G 18/72* (2013.01); *C08G 18/73* (2013.01); *C08G 18/7621* (2013.01); *C08G 18/7664* (2013.01); *C08G 18/7671* (2013.01); *C08G 18/792* (2013.01); *C08K 5/0066* (2013.01); *C08K 5/11* (2013.01); *C08K 5/49* (2013.01); *C08L 75/04* (2013.01); *C09K 21/08* (2013.01); *C09K 21/10* (2013.01); *C09K 21/12* (2013.01); *C09K 21/14* (2013.01); *G02F 1/153* (2013.01)

(58) Field of Classification Search
CPC .............. G02F 1/15; G02F 2001/1512; G02F 2001/1536; G02F 1/1533; G02F 1/153
USPC .................................. 359/265–275
See application file for complete search history.

(56) References Cited

U.S. PATENT DOCUMENTS

| | | |
|---|---|---|
| 4,297,401 A | 10/1981 | Chern et al. |
| 4,418,102 A | 11/1983 | Ferrato |

(Continued)

FOREIGN PATENT DOCUMENTS

| | | |
|---|---|---|
| CN | 105110357 A | 12/2015 |
| CN | 105220520 A | 1/2016 |

(Continued)

OTHER PUBLICATIONS

International Search Report and Written Opinion in PCT/162017/052325 dated Aug. 24, 2017 (9 pages).

*Primary Examiner* — William Choi
(74) *Attorney, Agent, or Firm* — Foley & Lardner LLP; Bradley D. Johnson

(57) ABSTRACT

An electrochromic device includes one or more flame-retardant agents.

6 Claims, 1 Drawing Sheet

(51) Int. Cl.
  *C08K 5/00* (2006.01)
  *C08K 5/11* (2006.01)
  *C08G 18/38* (2006.01)
  *C08K 5/49* (2006.01)
  *C08L 75/04* (2006.01)

(56) References Cited

U.S. PATENT DOCUMENTS

| | | |
|---|---|---|
| 4,695,490 A | 9/1987 | McClelland et al. |
| 4,902,108 A | 2/1990 | Byker |
| 5,596,023 A | 1/1997 | Tsubota et al. |
| 5,596,024 A | 1/1997 | Horie et al. |
| 5,818,625 A | 10/1998 | Forgette et al. |
| 5,928,572 A | 7/1999 | Tonar et al. |
| 5,998,617 A | 12/1999 | Srinivasa et al. |
| 6,002,511 A | 12/1999 | Varaprasad et al. |
| 6,020,987 A | 2/2000 | Baumann et al. |
| 6,037,471 A | 3/2000 | Srinivasa et al. |
| 6,137,620 A | 10/2000 | Guarr et al. |
| 6,141,137 A | 10/2000 | Byker et al. |
| 6,157,480 A | 12/2000 | Anderson et al. |
| 6,168,885 B1 * | 1/2001 | Narang ............... H01M 4/0404 29/623.1 |
| 6,188,505 B1 | 2/2001 | Lomprey et al. |
| 6,193,912 B1 | 2/2001 | Thieste et al. |
| 6,241,916 B1 | 6/2001 | Claussen et al. |
| 6,249,369 B1 | 6/2001 | Theiste et al. |
| 6,597,489 B1 | 7/2003 | Guarr et al. |
| 6,635,194 B2 | 10/2003 | Kloeppner et al. |
| 6,700,692 B2 | 3/2004 | Tonar et al. |
| 6,710,906 B2 | 3/2004 | Guarr et al. |
| 6,714,334 B2 | 3/2004 | Tonar |
| 7,046,418 B2 | 5/2006 | Lin et al. |
| 7,372,611 B2 | 5/2008 | Tonar et al. |
| 7,855,821 B2 | 12/2010 | Baumann et al. |
| 9,099,756 B2 | 8/2015 | Choi et al. |
| 2002/0015214 A1 | 2/2002 | Nishikitani et al. |
| 2008/0138600 A1 * | 6/2008 | Cunningham ......... B82Y 30/00 428/304.4 |
| 2010/0084600 A1 | 4/2010 | Ahmad et al. |
| 2011/0255141 A1 | 10/2011 | Agrawal et al. |
| 2015/0076390 A1 * | 3/2015 | Kloeppner ............... G02F 1/153 252/62.2 |
| 2016/0011441 A1 | 1/2016 | Schwartz et al. |
| 2016/0062001 A1 * | 3/2016 | Wiersema ......... B32B 17/10091 359/267 |

FOREIGN PATENT DOCUMENTS

| | | |
|---|---|---|
| JP | 2016-003216 A | 1/2016 |
| WO | WO-98/42796 A1 | 10/1998 |
| WO | WO-99/02621 | 1/1999 |
| WO | WO-2005/059638 A1 | 6/2005 |

* cited by examiner

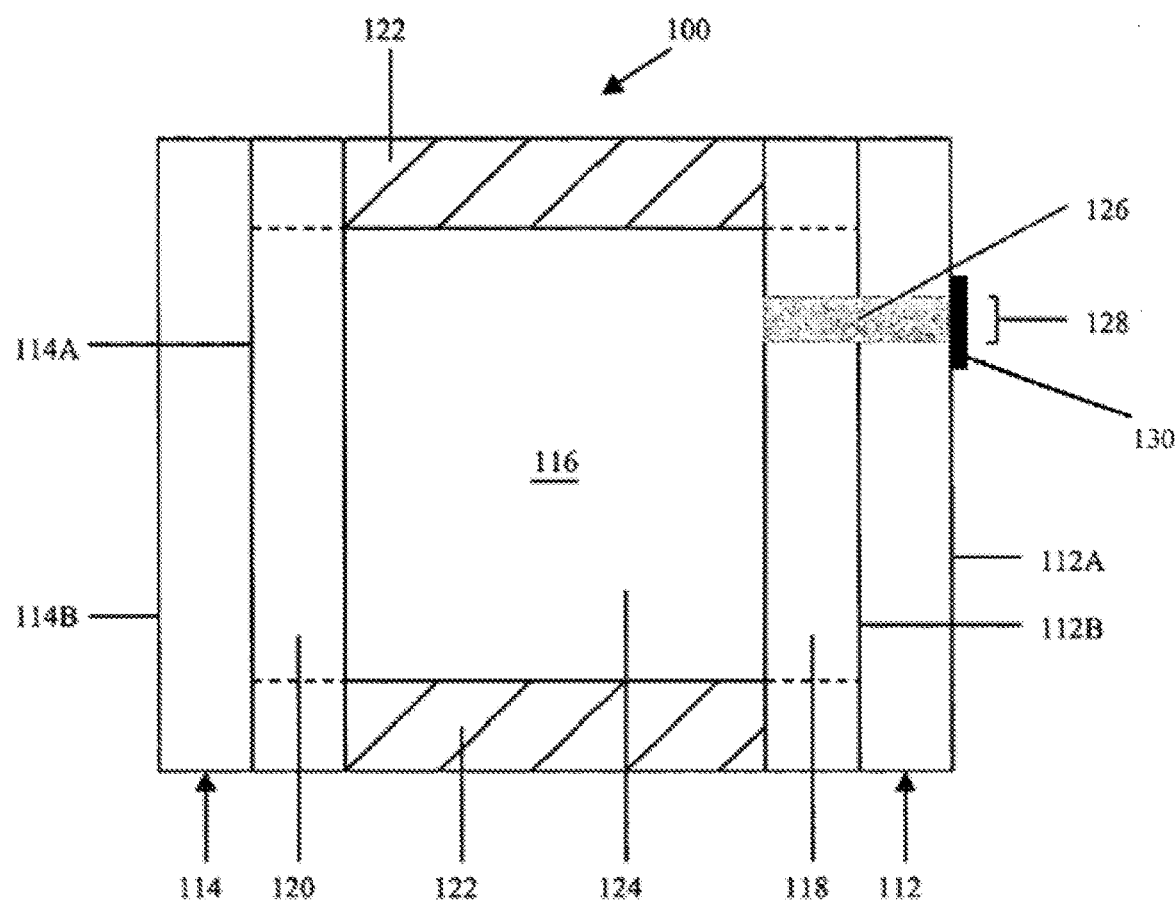

FLAME RETARDANCY OF ELECTROCHROMIC DEVICES

CROSS-REFERENCE TO RELATED APPLICATIONS

This application claims the benefit of priority to U.S. Provisional Patent Application No. 62/326,369, filed on Apr. 22, 2016, and which is incorporated herein by reference in its entirety for any and all purposes.

FIELD

The present technology relates generally to the field of electrochromic devices and apparatuses incorporating these devices. More particularly, the technology relates to improved flame retardancy of these devices. More specifically, the technology relates to improved flame retardancy of the electrochromic medium and/or the sealing member.

SUMMARY

In one aspect, provided are electrochromic devices containing one or more flame-retardant agents. In some embodiments, each of the one or more flame-retardant agents is independently selected from the group consisting of flame-retardant co-solvents, electrochromic medium flame-retardant additives, flame-retardant gel matrix materials, and sealing member flame retardant additives. In some embodiments, the electrochromic devices contain the flame-retardant co-solvents including fluorinated carbonates, ionic liquids, or any combination thereof. In some embodiments, the fluorinated carbonates include 2-fluoro ethylene carbonate (FEC), bis(2,2,2-trifluoroethyl) carbonate, 3,3,3-trifluoropropylene carbonate, or any combination thereof. In some embodiments, the ionic liquids include 1-butyl-2,3-dimethylimidazolium tetrafluoroborate, 4-methyl-1-butyl pyridinium bis(trifluoromethylsulfonyl)imide, 1-ethyl-3-methylimidazlium bis(trifluoromethylsulfonyl)imide or any combination thereof. In some embodiments, the electrochromic devices contain the electrochromic medium flame-retardant additives including phosphate compounds, cyclic and polymeric phosphazene compounds, phosphazene bases, fluorinated esters, fluorinated ethers, fluorinated electrolyte salts, or a combination of any two or more thereof. In some embodiments, the electrochromic devices contain the phosphate compounds, wherein the phosphate compounds include tributyl phosphate, diphenyloctyl phosphate, triphenyl phosphate, triethyl phosphate, tricresyl phosphate, trixylenyl phosphate, tris(2-butoxyethyl) phosphate, or a combination of any two or more thereof. In some embodiments, the electrochromic devices contain the cyclic or polymeric phosphazene compounds, wherein the cyclic and polymeric phosphazene compounds include 2,2,4,4,6,6-hexahydro-2,2,4,4,6,6-hexakis(p-tolyloxy)triazatriphosphorine, poly(bis(phenoxy)phosphazine), poly(bis(ethoxy)phosphazene), poly(bis(2,2,2-trifluoroethoxy)phosphazene), poly(bis(4-(ethoxy carbonyl)phenoxy)phosphazene), or a combination of any two or more thereof. In some embodiments, the electrochromic devices contain the phosphazene bases, wherein the phosphazene bases include tert-butylimino-tri(pyrrolidino)phosphorane, tert-octylimino-tris(dimethylamino)phosphorane, or a combination thereof. In some embodiments, the electrochromic devices contain the fluorinated esters, wherein the fluorinated esters include methyl perfluorooctanoate, dimethyl tetrafluorosuccinate, dimethyl hexafluoroglutarate, dimethyl octafluoroadipate, ethylperfluorobutyrate, or a combination of any two or more thereof. In some embodiments, the electrochromic devices contain the fluorinated ethers, wherein the fluorinated ethers include 1,1,1,2,2,3,3-heptafluoro-3-methoxypropane, ethoxynonafluorobutane, 1,1,1,2,2,3,4,5,5,5-decafluoro-3-methoxy-4-(trifluoromethyl)pentane, or any combination thereof. In some embodiments, the electrochromic devices contain the fluorinated electrolyte salts, wherein the fluorinated electrolyte salts include tetraethylammonium hexafluorophosphate, lithium hexafluorophosphate, lithium bis(trifluoromethanesulfonyl)imide, tetrabutylammonium hexafluorophosphate, tetraethylammonium tetrafluoroborate or a combination of any two or more thereof. In some embodiments, the electrochromic devices contain the flame-retardant gel matrix materials including fluorinated poly(ethylene glycol) which is cross-linked with a cross-linking agent. In further embodiments, the fluorinated poly(ethylene glycol) comprises 1H,1H,8H,8H-perfluoro-3,6-dioxaoctane-1,8-diol. In some embodiments, the cross-linking agent includes an aliphatic or aromatic polyisocyanate. In some embodiments, the polyisocyanate comprises HDT (trimer of hexamethylene diisocyanate), p-MDI (polymethylene polyphenylisocyanate), TDI (toluene diisocyanate), MDI (methylene diphenyl diisocyanate), or a combination of any two or more thereof. In some embodiments, the sealing member flame-retardant additives include metal hydroxides, melamine polyphosphates, metal salts of dialkyl phosphinates, aromatic phosphates, or a combination of any two or more thereof. In some embodiments, the metal hydroxides include aluminum hydroxide, magnesium hydroxide, or a combination thereof. In some embodiments, the metal salts of dialkyl phosphinates include aluminum diethyl phosphinate. In some embodiments, the aromatic phosphates include triphenyl phosphate, bridged aromatic diphenyl phosphates, or a combination thereof. In some embodiments, the electrochromic devices further contain an electrochromic medium including at least one cathodic electroactive material; and a chamber defined by a first conductive surface of a first substrate, a second conductive surface of a second substrate, and a sealing member joining the first substrate to the second substrate, wherein the electrochromic medium is disposed within the chamber. In further embodiments, the electrochromic devices further include at least one anodic electroactive material. In some embodiments, the electrochromic devices further include at least one solvent, at least one crosslinked gel matrix, or any combination thereof. In some embodiments, the sealing member is an epoxy sealing member. In some embodiments, one or more flame-retardant agents are located in the electrochromic medium. In some embodiments, one or more flame-retardant agents are located at the epoxy sealing member. In some embodiments, one or more flame-retardant agents are located within the sealing member. In the electrochromic devices at least one of the cathodic electroactive material and the anodic electroactive material is electrochromic.

In another aspect, provided are electrochromic aircraft transparencies comprising an electrochromic medium containing at least one cathodic electroactive material and one or more flame-retardant agents; and a chamber defined by a first conductive surface of a first substrate, a second conductive surface of a second substrate, and a sealing member joining the first substrate to the second substrate, wherein the electrochromic medium is disposed within the chamber. In some embodiments, the electrochromic aircraft transparencies further contain at least one anodic electroactive material. In some embodiments, the electrochromic aircraft transparencies further contain at least one solvent, at least one crosslinked gel matrix, or any combination thereof. In some embodiments, the sealing member is an epoxy sealing member. In some embodiments, one or more flame-retardant agents are located in the electrochromic medium. In some embodiments, one or more flame-retardant agents are located at the epoxy sealing member. In some embodiments, one or more flame retardant agents are located within the sealing member.

Additional features, advantages, and embodiments of the technology may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The disclosure will become more fully understood from the following detailed description, taken in conjunction with the accompanying FIGURES, in which:

FIG. 1 is a cross-sectional schematic representation of an electrochromic device according to one embodiment.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Electrochromic devices can be used in a wide variety of applications wherein the transmitted or reflected light/heat can be modulated. Such devices include mirrors; aircraft transparencies; windows for the exterior of a building, home or vehicle; skylights for buildings including tubular light filters; windows in office or room partitions; and light filters for photographic devices and light sensors. An electrochromic device generally contains one or more flammable or combustible components (e.g., solvent, seal member) within the device. Mitigating the flammability or combustibility, or even the possibility of flammability or combustibility, of an electrochromic device, especially under circumstances where a fire may or does occur, would improve safety concerns associated with the use of such electrochromic devices.

Provided herein, in one aspect, are electrochromic devices with improved flame retardancy compared to previously described electrochromic devices. The electrochromic devices described herein contain one or more flame-retardant agents. The one or more flame-retardant agents may be located within the electrochromic medium, at the epoxy sealing member, within the sealing member, or a combination of any two or more thereof. In some embodiments, one or more flame-retardant agents are located within the electrochromic medium. In some embodiments, one or more flame-retardant agents are located at the epoxy sealing member. In further embodiments, one or more flame-retardant agents are located within the epoxy sealing member. In some embodiments, one or more flame-retardant agents are located within the electrochromic medium and within the epoxy sealing member.

Provided herein, in another aspect, are electrochromic aircraft transparencies comprising an electrochromic medium containing at least one cathodic electroactive material and one or more flame-retardant agents; and a chamber defined by a first conductive surface of a first substrate, a second conductive surface of a second substrate, and a sealing member joining the first substrate to the second substrate, wherein the electrochromic medium is disposed within the chamber.

Provided herein, in another aspect, are electrochromic aircraft transparencies comprising an electrochromic medium containing at least one cathodic electroactive material; and a chamber defined by a first conductive surface of a first substrate, a second conductive surface of a second substrate, and a sealing member joining the first substrate to the second substrate, wherein the electrochromic medium is disposed within the chamber; and one or more flame-retardant agents are located within the electrochromic medium and at the sealing member.

Provided herein, in another aspect, are electrochromic aircraft transparencies comprising an electrochromic medium containing at least one cathodic electroactive material; and a chamber defined by a first conductive surface of a first substrate, a second conductive surface of a second substrate, and a sealing member joining the first substrate to the second substrate, wherein the electrochromic medium is disposed within the chamber; and one or more flame-retardant agents are located at the sealing member.

Provided herein, in another aspect, are electrochromic aircraft transparencies comprising an electrochromic medium containing at least one cathodic electroactive material; and a chamber defined by a first conductive surface of a first substrate, a second conductive surface of a second substrate, and a sealing member joining the first substrate to the second substrate, wherein the electrochromic medium is disposed within the chamber; and one or more flame-retardant agents are located within the electrochromic medium and within the sealing member.

Illustrative flame-retardant agents include, but are not limited to, flame-retardant co-solvents, electrochromic medium flame-retardant additives, flame-retardant gel matrix materials and seal member flame retardant additives. In some embodiments, each of the one or more flame-retardant agents is independently selected from the group consisting of flame-retardant co-solvents, electrochromic medium flame-retardant additives, flame-retardant gel matrix materials, and seal member flame retardant additives. In some embodiments, the one or more flame-retardant agents include flame-retardant co-solvents. In some embodiments, the one or more flame-retardant agents include electrochromic medium flame-retardant additives. In some embodiments, the one or more flame-retardant agents include flame-retardant gel matrix materials. In some embodiments, the one or more flame retardant agents include seal member flame retardant additives.

Illustrative flame-retardant co-solvents include, but are not limited to, fluorinated carbonates, ionic liquids, or any combination thereof. In some embodiments, fluorinated carbonates include 2-fluoro ethylene carbonate (FEC), bis(2,2,2-trifluoroethyl) carbonate, 3,3,3-trifluoropropylene carbonate, or any combination thereof. In some embodiments, fluorinated carbonates include 2-fluoro ethylene carbonate (FEC). In some embodiments, fluorinated carbonates include bis(2,2,2-trifluoroethyl) carbonate. In some embodiments, fluorinated carbonates include 3,3,3-trifluoropropylene carbonate. In some embodiments, the ionic liquids include 1-butyl-2,3-dimethylimidazolium tetrafluoroborate, 4-methyl-1-butyl pyridinium bis(trifluoromethylsulfonyl)imide, 1-ethyl-3-methylimidazlium bis(trifluoromethylsulfonyl)imide or any combination thereof.

Illustrative electrochromic medium flame-retardant additives include, but are not limited to phosphate compounds, cyclic and polymeric phosphazene compounds, phosphazene bases, fluorinated esters, fluorinated ethers, fluorinated electrolyte salts, or a combination of any two or more thereof. In some embodiments, the electrochromic medium flame-retardant additives include phosphate compounds, cyclic and polymeric phosphazene compounds, phosphazene bases, fluorinated esters, fluorinated ethers, fluorinated electrolyte salts, or a combination of any two or more thereof.

In some embodiments, the electrochromic medium flame-retardant additives include phosphate compounds. Illustrative phosphate compounds include, but are not limited to, tributyl phosphate, diphenyloctyl phosphate, triphenyl phosphate, triethyl phosphate, tricresyl phosphate, trixylenyl phosphate, tris(2-butoxyethyl) phosphate, or a combination of any two or more thereof. In some embodiments, the phosphate compounds include tributyl phosphate. In some embodiments, the phosphate compounds include diphenyloctyl phosphate. In some embodiments, the phosphate compounds include triphenyl phosphate. In some embodiments, the phosphate compounds include triethyl phosphate. In some embodiments, the phosphate compounds include tricresyl phosphate. In some embodiments, the phosphate compounds include trixylenyl phosphate. In some embodiments, the phosphate compounds include tris(2-butoxyethyl) phosphate.

In some embodiments, the electrochromic medium flame-retardant additives include cyclic and polymeric phosphazene compounds. Illustrative cyclic and polymeric phosphazene compounds may include, but are not limited to, 2,2,4,4,6,6-hexahydro-2,2,4,4,6,6-hexakis(p-tolyloxy)triazatriphosphorine, poly(bis(phenoxy)phosphazine), poly(bis(ethoxy)phosphazene), poly(bis(2,2,2-trifluoroethoxy)phosphazene), poly(bis(4-(ethoxy carbonyl)phenoxy)phosphazene, or a combination of any two or more thereof. In some embodiments, the cyclic and polymeric phosphazene compounds include 2,2,4,4,6,6-hexahydro-2,2,4,4,6,6-hexakis(p-tolyloxy)triazatriphosphorine. In some embodiments, the cyclic and polymeric phosphazene compounds include poly(bis(phenoxy)phosphazine). In some embodiments, the cyclic and polymeric phosphazene compounds include poly(bis(ethoxy)phosphazene). In some embodiments, the cyclic and polymeric phosphazene compounds include poly(bis(2,2,2-trifluoroethoxy)phosphazene). In some embodiments, the cyclic and polymeric phosphazene compounds include poly(bis(4-(ethoxy carbonyl)phenoxy)phosphazene.

As used herein, "2,2,4,4,6,6-hexahydro-2,2,4,4,6,6-hexakis(p-tolyloxy)triazatriphosphorine" will be understood to represent the compound with the following chemical structure:

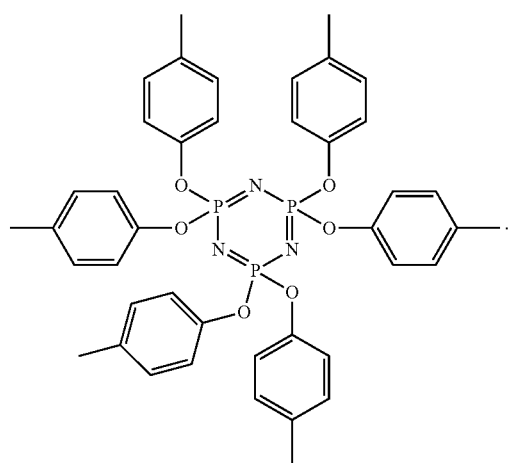

In some embodiments, the electrochromic medium flame-retardant additives include phosphazene bases. Illustrative phosphazene bases include, but are not limited to, tert-butylimino-tri(pyrrolidino)phosphorane, tert-octylimino-tris(dimethylamino)phosphorane, or a combination thereof. In some embodiments, the phosphazene bases include tert-butylimino-tri(pyrrolidino)phosphorane. In some embodiments, the phosphazene bases include tert-octylimino-tris(dimethylamino)phosphorane In some embodiments, the electrochromic medium flame-retardant additives include fluorinated esters. Illustrative fluorinated esters include, but are not limited to, methyl perfluorooctanoate, dimethyl tetrafluorosuccinate, dimethyl hexafluoroglutarate, dimethyl octafluoroadipate, ethylperfluorobutyrate, or a combination of any two or more thereof. In some embodiments, the fluorinated esters include methyl perfluorooctanoate. In some embodiments, the fluorinated esters include dimethyl tetrafluorosuccinate. In some embodiments, the fluorinated esters include dimethyl hexafluoroglutarate. In some embodiments, the fluorinated esters include dimethyl octafluoroadipate. In some embodiments, the fluorinated esters include ethylperfluorobutyrate.

In some embodiments, the electrochromic medium flame-retardant additives include fluorinated ethers. Illustrative fluorinated ethers include, but are not limited to, 1,1,1,2,2,3,3-heptafluoro-3-methoxypropane, ethoxynonafluorobutane, 1,1,1,2,2,3,4,5,5,5-decafluoro-3-methoxy-4-(trifluoromethyl)-pentane, or any combination thereof. In some embodiments, the fluorinated ethers include 1,1,1,2,2,3,3-heptafluoro-3-methoxypropane. In some embodiments, the fluorinated ethers include 1,1,1,2,2,3,4,5,5,5-decafluoro-3-methoxy-4-(trifluoromethyl)-pentane. In some embodiments, the fluorinated ethers include ethoxynonafluorobutane.

In some embodiments, the electrochromic medium flame-retardant additives include fluorinated electrolyte salts. Illustrative fluorinated electrolyte salts include, but are not limited to, tetraethylammonium hexafluorophosphate, lithium hexafluorophosphate, lithium bis(trifluoromethanesulfonyl)imide, tetrabutylammonium hexafluorophosphate, tetraethylammonium tetrafluoroborate or a combination of any two or more thereof. In some embodiments, the fluorinated electrolyte salts include tetraethylammonium hexafluorophosphate. In some embodiments, the fluorinated electrolyte salts include lithium hexafluorophosphate. In some embodiments, the fluorinated electrolyte salts include lithium bis(trifluoromethanesulfonyl)imide. In some embodiments, the fluorinated electrolyte salts include tetrabutylammonium hexafluorophosphate. In some embodiments, the fluorinated electrolyte salts include tetraethylammonium tetrafluoroborate.

Illustrative flame-retardant gel matrix materials include, but are not limited to, fluorinated poly(ethylene glycol) which is cross-linked with a cross-linking agent. In further embodiments, the fluorinated poly(ethylene glycol) includes 1H,1H,8H,8H-perfluoro-3,6-dioxaoctane-1,8-diol. In some embodiments, the cross-linking agent includes an aliphatic or aromatic polyisocyanate. In some embodiments, the polyisocyanate includes HDT (trimer of hexamethylene diisocyanate), methylene diphenyl diisocyanate (MDI), toluene diisocyanate (TDI), polymethylene polyphenylisocyanate (p-MDI), or a combination of any two or more thereof. Representative HDTs include TOLONATEυ HDT and BASONAT® HI 100. In some embodiments, the polyisocyanate is HDT. In some embodiments, the polyisocyanate is p-MDI. In some embodiments, the polyisocyanate is TDI. In some embodiments, the polyisocyanate is MDI.

Illustrative seal member flame-retardant additive materials include, but are not limited to, metal hydroxides, melamine polyphosphates, metal salts of dialkyl phosphinates, aromatic phosphates, or any combination of two or more thereof. In some embodiments, the metal hydroxides include aluminum hydroxide and magnesium hydroxide either used alone or in combination with other flame retardants. In some embodiments, melamine polyphosphate such as Melapur 200 available from BASF is used alone or in combination with one or more other flame retardants. Illustrative metal salts of dialkyl phosphinates include, but are not limited to, aluminum diethyl phosphinate such as Exolit OP 930/935/1230 available from Clariant. In some embodiments, aluminum diethyl phosphinate is used alone or in combination with one or more other flame retardants. Illustrative aromatic phosphates include, but are not limited to, triphenyl phosphate and bridged aromatic diphenyl phosphates such as resorcinol bis(diphenyl phosphate) (RDP), bisphenol A bis(diphenyl phosphate) (BDP), and resorcinol bis(dixylenyl phosphate) RDX. Another example of a flame retardant aromatic phosphate is 9,10-dihydro-9-oxa-10-phosphaphenanthrene 10-oxide (DOPO) and DOPO based additives prepared by pre-reacting DOPO with epoxy resins. In some embodiments, aromatic, bridged aromatic, or DOPO based phosphates are used alone or in combination with one or more other flame retardants.

The flame-retardant agents may be present in the electrochromic medium in an amount of about 0.5 wt. % to about 80 wt. %. In some embodiments, the flame-retardant agents are present in the electrochromic medium in an amount of about 20 wt. % to about 50 wt. %.

The flame-retardant agents may be present in the sealing member in an amount of about 0.5 wt. % to about 20 wt. %. In some embodiments, the flame-retardant agents are present in the sealing member in an amount of about 5 wt. % to about 15 wt. %. In some embodiments, the flame-retardant agents are present in the sealing member in an amount of about 5 wt. % to about 10 wt. %.

Illustrative electrochromic device 100 may include, for illustrative purposes only, a window, an aircraft transparency, a mirror, a display device, and the like. It will be understood that like or analogous elements and/or components, and/or methods referred to herein, may be identified throughout the drawings with like reference characters. In some embodiments, the electrochromic device is an electrochromic window or an electrochromic mirror. In some embodiments, the device is a vehicular interior electrochromic mirror. In some embodiments, the device is a variable transmission electrochromic window. In some embodiments, the device is an aircraft window system. Other applications of the electrochromic device includes screens for watches, calculators and computer display screens; eye wear such as eyeglasses and sunglasses; switchable mirrors, sun visors; automobile, architectural, aircraft, marine, and spacecraft windows; information display boards and digital billboards and the like. It will be further understood that FIG. 1 is merely a schematic representation of electrochromic device 100. As such, some of the components have been distorted from their actual scale for pictorial clarity. Indeed, numerous other electrochromic device configurations are contemplated for use, including, but not limited to, those disclosed in U.S. Pat. Nos. 5,818,625; 6,597,489; and 6,700,692, all of which are hereby incorporated herein by reference in their entirety including all references incorporated therein.

In the device, the first substrate 112 may be fabricated from any of a number of materials that are transparent or substantially transparent in the visible region of the electromagnetic spectrum, such as, for example, borosilicate glass, soda lime glass, natural and synthetic polymeric resins, plastics, ceramics and/or composites including polyesters (e.g., PET), polyimides (PI), polycarbonates, polysulfones, polyethylene naphthalate (PEN), ethylene vinyl acetate (EVA), polyamides, cyclic olefin polymers (COP), and acrylate polymers, as well as Topas®, which is commercially available cyclic olefin copolymers (COC) from Ticona of Summit, N.J. In some embodiments, the first substrate 112 may be fabricated from a sheet of glass having a thickness ranging from approximately 0.10 millimeters (mm) to approximately 12.7 mm. This may include where the thickness is from approximately 0.50 mm to approximately 1.50 mm, approximately 0.65 mm to approximately 1.00 mm, or approximately 0.75 mm to approximately 1.00 mm. Of course, the thickness of the substrate will depend largely upon the particular application of the electrochromic device. While particular substrate materials have been disclosed, for illustrative purposes only, it will be understood that numerous other substrate materials are likewise contemplated for use that exhibit appropriate physical properties, such as strength, to be able to operate effectively in conditions of intended use. Indeed, electrochromic devices may be, during normal operation, exposed to extreme temperature variation as well as substantial UV radiation, emanating primarily from the sun. It will be further understood that first substrate 112, second substrate 114, or both the first and second substrates may include a UV absorbing layer and/or contain a UV absorbing material to help protect the substrate(s) and/or the electrochromic media from UV damage.

Second substrate 114 may be fabricated from similar materials as that of first substrate 112. However, if the electrochromic device is a mirror, or the electrochromic device includes a mirrored surface, depending upon the surface that incorporates the mirror, the substrate may or may not be transparent. For example, the substrate may be transparent where the distal surface is the mirrored surface, and it may not be transparent where a proximal surface is mirrored. Accordingly, materials for use as the second substrate 114 may include polymers, metals, glass, and ceramics. Second substrate 114 is may be fabricated from a sheet of glass or plastic having a thickness ranging from approximately 0.10 mm to approximately 12.7 mm. This may include where the thickness is from approximately 0.50 mm to approximately 1.50 mm, approximately 0.65 mm to approximately 1.00 mm, or approximately 0.75 mm to approximately 1.00 mm. If first and second substrates 112 and 114, respectively, are fabricated from sheets of glass, then the glass can optionally be tempered, heat strengthened, chemically strengthened, and/or laminated prior to or subsequent to being coated with layers of electrically conductive material (118 and 120).

One or more layers of electrically conductive material 118 are associated with rear surface 112B of first substrate 112. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffuse or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide, indium zinc oxide, metal oxide/Ag/metal oxide, or other materials known to those having ordinary skill in the art.

One or more layers of electrically conductive material 120 made of the same or different materials as those associated with the rear surface 112B of the first substrate 112 may be associated with the front surface 114A of second substrate 114, and it may be operatively bonded to an electrically conductive material 118 by edge seal 122. As can be seen in FIG. 1, once bonded, edge seal 122, optional plug 126, and the juxtaposed portions of electrically conductive materials 118 and 120 serve to generally define an inner peripheral geometry of chamber 116. Edge sealing techniques may be utilized which are disclosed in U.S. Pat. No. 7,372,611. In some embodiments, the device contains an epoxy sealing member (not shown).

Electrically conductive material 120 may vary depending upon the intended use of the electrochromic device. For example, if the electrochromic device is a mirror, then the material may include a transparent conductive coating similar to electrically conductive material 118 (in which case a reflector is associated with rear surface 114B of second substrate 114). Alternatively, electrically conductive material 120 may include a layer of reflective material as shown in U.S. Pat. No. 5,818,625. In this case, electrically conductive material 120 is associated with front surface 114A of second substrate 114. Typical coatings for this type of reflector include chromium, rhodium, ruthenium, silver, silver alloys, and combinations thereof.

In some embodiments, the cell spacing between inner surfaces of substrates 112 and 114 is from approximately 10 microns (µm) to approximately 750 µm. This includes where the cell spacing is from approximately 20 µm to approximately 600 µm. It will be understood that the thickness of the cell spacing will depend largely upon the particular application of the electrochromic device.

In some embodiments, the first substrate and second substrate have a cell distance of less than 700 µm. In another embodiment, the first substrate and second substrate have a cell distance of about 150 µm to about 700 µm, about 200 µm to about 600 µm, about 250 µm to about 500 µm, or ranges between any two of these values (including endpoints). In another embodiment, the first substrate and second substrate have a cell distance of about 700 µm, 650 µm, 600 µm, 550 µm, 500 µm, 450 µm, 400 µm, 350 µm, 300 µm, 275 µm, 250 µm, 225 µm, 200 µm, 175 µm, 150 µm, or ranges between any two of these values (including endpoints). In another embodiment, the first substrate and second substrate have a cell distance of about 400 µm.

In one embodiment, the electrochromic device 100 has a high transmittance when unpowered, or in other words in the absence of an applied potential. Conversely, when the electrochromic device is subjected to an applied potential it may have a low transmittance. In other words, unpowered, the electrochromic device allows light to pass, while in a low transmittance state light is absorbed. The amount of light that is transmitted or absorbed is dependent upon the types of substrates used, the applied potential and the properties of the electrochromic medium.

Sealing member 122 may include any material that is capable of being adhesively bonded to the electrically conductive materials 118 and 120 forming chamber 116, so that electrochromic medium 124 does not inadvertently leak out of the chamber and/or be exposed to the atmosphere (in certain embodiments in cooperation with a plug and fill port). As is shown in dashed lines in FIG. 1, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to substrates 112 and 114, which may be comprised of glass. It will be understood that sealing member 122 can be fabricated from any one of a number of materials including, for example, those disclosed in U.S. Pat. Nos. 4,297,401; 4,418,102; 4,695,490; 5,596,023; 5,596,024; 6,157,480; and 6,714,334.

For purposes of the present disclosure, and as will be explained in greater detail herein below, electrochromic medium 124 typically includes at least one solvent, at least one anodic material, and at least one cathodic material. Typically both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

In some embodiments, the concentration of the anodic and/or cathodic materials in the electrochromic medium may be from about 1 millimolar (mM) to about 500 mM. In some embodiments, the concentration of the anodic and/or cathodic materials in the electrochromic medium may be from about 2 mM to about 100 mM. While particular concentrations of the anodic as well as cathodic materials have been provided, it will be understood that the desired concentration may vary greatly depending upon the geometric configuration of the chamber containing electrochromic medium 124.

In some embodiments, at least one of the anodic electroactive materials has a concentration of at least 5 mM. In some embodiments, at least one of the anodic electroactive materials has a concentration of about 2 mM to about 100 mM, about 5 mM to about 75 mM, about 7 mM to about 50 mM, or ranges between any two of these values (including endpoints). In some embodiments, at least one of the anodic electroactive materials has a concentration of about 5 mM to about 7 mM. In some embodiments, a second anodic electroactive material has a concentration of about 40 mM to about 50 mM.

In some embodiments, at least one of the cathodic electroactive materials has a concentration of at least 50 mM. In some embodiments, at least one of the cathodic electroactive materials has a concentration of about 50 mM to about 100 mM, about 60 to about 90 mM, about 70 mM to about 80 mM, or ranges between any two of these values (including endpoints).

The electrochromic medium may include a single-layer of material which may include small non-homogenous regions and includes solution-phase devices where a material may be contained in solution in an ionically conducting electrolyte which remains in solution in the electrolyte when electrochemically oxidized or reduced. Solution phase electroactive materials may be contained in the continuous solution-phase of a gel medium as shown in U.S. Pat. Nos. 5,928,572 and 6,635,194 and in International Patent Application Serial No. PCT/US98/05570, which are hereby incorporated herein by reference in their entirety.

More than one anodic, and/or more than one cathodic material can be combined to give a pre-selected color as described in U.S. Pat. Nos. 5,998,617; 6,020,987; 6,037,471; and 6,141,137. The anodic and cathodic materials may also be combined or linked by a bridging unit as described in U.S. Pat. No. 6,241,916 or U.S. Patent Publication No. 2002/0015214. The electrochromic materials may also include near-infrared (NIR) absorbing compounds as described in U.S. Pat. No. 6,193,912. It is also possible to link anodic materials or cathodic materials by similar methods. The anodic and cathodic electrochromic materials can also include coupled materials as described in U.S. Pat. No. 6,249,369. The concentration of the electrochromic materials can be selected as taught in U.S. Pat. No. 6,137,620. Additionally, a single-layer, single-phase medium may include a medium where the anodic and cathodic materials are incorporated into a polymer matrix as is described in International Patent Application Serial Nos. PCT/EP98/03862 and PCT/US98/05570.

The electrochromic medium may have a layered structure including a material attached directly to an electrically conducting electrode or confined in close proximity thereto which remains attached or confined when electrochemically oxidized or reduced. Alternatively, one or more materials in the electrochromic medium may undergo a change in phase during the operation of the device. For example, a material contained in solution in the ionically conducting electrolyte forms a layer on the electrically conducting electrode when electrochemically oxidized or reduced.

In addition, electrochromic medium 124 may include other materials, such as light absorbers, light stabilizers, thermal stabilizers, antioxidants, thickeners, viscosity modifiers, tint providing agents, redox buffers, and mixtures thereof. Suitable redox buffers include, among others, those disclosed in U.S. Pat. No. 6,188,505. Suitable UV-stabilizers may include, but are not limited to, 2-ethyl-2-cyano-3,3-diphenyl acrylate (Uvinul® N-35 or Viosorb® 910), (2-ethylhexyl)-2-cyano-3,3-diphenyl acrylate (Uvinul® N-539), 2-(2'-hydroxy-4'-methylphenyl)benzotriazole (Tinuvin® P), 3-[3-(2H-benzotriazole-2-yl)-5-(1,1-dimethylethyl)-4-hydroxyphenyl]propionic acid pentyl ester (prepared from Tinuvin® 213 via conventional hydrolysis followed by conventional esterification; hereinafter referred to as "Tinuvin PE"); 2,4-dihydroxybenzophenone, 2-hydroxy-4-methoxybenzophenone (Cyasorb® UV 9), and 2-ethyl-2'-ethoxyalanilide (Sanduvor® VSU). In some embodiments, the electrochromic medium 124 contains at least one crosslinked gel matrix. In some embodiments, the electrochromic medium 124 contains at least one crosslinked gel matrix and at least one solvent.

Illustrative anodic materials may include, but are not limited to, ferrocene, substituted ferrocenes, phenazine, substituted phenazines, phenothiazine, substituted phenothiazines including substituted dithiazines, thianthrene, and substituted thianthrenes. Examples of anodic materials may include di-tert-butyl-diethylferrocene, 5,10-dimethyl-5,10-dihydrophenazine (DMP), 3,7,10-trimethylphenothiazine, 2,3,7,8-tetramethoxy-thianthrene, 10-methylphenothiazine, tetramethylphenazine (TMP), bis(butyltriethylammonium)-para-methoxytriphenodithiazine (TPDT), polymer films such as polyaniline, polythiophene, and polymeric metallocenes, a solid transition metal oxides including, but not limited to, oxides of vanadium, nickel, iridium, as well as numerous heterocyclic compounds. It will be understood that numerous other anodic materials are contemplated for use including those disclosed in U.S. Pat. Nos. 4,902,108; 6,188,505; and 6,710,906.

Cathodic materials may include, but are not limited to, viologens and ferrocinium salts. Illustrative viologens include, but are not limited to, methyl viologen tetrafluoroborate, octyl viologen tetrafluoroborate (octylviologen), and benzyl viologen tetrafluoroborate. Illustrative ferrocinium salts include, but are not limited to, (6-(tri-tert-butylferrocinium)hexyl)triethylammonium tetrafluoroborate (TTBFc$^+$). Additional illustrative cathodic materials include, but are not limited to, compounds disclosed in U.S. Pat. Nos. 7,046,418; 7,855,821; 4,902,108; 6,188,505; and 6,710,906. In some embodiments, the cathodic material comprises viologens. In some embodiments, the cathodic material comprises ferrocinium salts. Moreover, it is contemplated that the cathodic material may include a polymer film, such as various substituted polythiophenes, polymeric viologens, an inorganic film, or a solid transition metal oxide, including, but not limited to, tungsten oxide.

Illustrative solvents for use in the electrochromic medium may include, but are not limited to, 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; propylene carbonate (PC), ethylene carbonate; and homogenous mixtures of the same. While specific solvents have been disclosed as being associated with the electrochromic medium, numerous other solvents that would be known to those having ordinary skill in the art having the present disclosure before them are likewise contemplated for use.

What is claimed is:

1. An electrochromic device comprising:
a chamber defined by a first conductive surface of a first substrate, a second conductive surface of a second substrate, and a sealing member joining the first substrate to the second substrate;
an electrochromic medium disposed within the chamber and comprising a cathodic electroactive material and an anodic electroactive material wherein at least one of the cathodic and anodic electroactive materials is electrochromic; and
a flame-retardant agent which is one or more of:
  a flame-retardant co-solvent comprising:
  a fluorinated carbonate, an ionic liquid, or any combination thereof;
  an electrochromic medium flame-retardant additive comprising a cyclic and polymeric phosphazene compound, a phosphazene base, a fluorinated ester, a fluorinated ether, a fluorinated electrolyte salt, or a combination of any two or more thereof; or
  a flame-retardant gel matrix material comprising a fluorinated poly(ethylene glycol) cross-linked with a cross-linking agent comprising an aliphatic or aromatic polyisocyanate;
wherein:
  the electrochromic device is an electrochromic aircraft transparency;
  the fluorinated carbonate comprises 2-fluoroethylene carbonate (FEC), bis(2,2,2-trifluoroethyl) carbonate, 3,3,3-trifluoropropylene carbonate, or a combination of any two or more thereof;
  the ionic liquid comprises 1-butyl-2,3-dimethylimidazolium tetrafluoroborate, 4-methyl-1-butyl pyridinium bis(trifluoromethylsulfonyl)imide, 1-ethyl-3-methylimidazlium bis(trifluoromethylsulfonyl)imide, or a combination of any two or more thereof;
  the cyclic and polymeric phosphazene compound is 2,2,4,4,6,6-hexahydro-2,2,4,4,6,6-hexakis(p-tolyloxy)triazatriphosphorine, poly(bis(phenoxy)phosphazine), poly(bis(ethoxy)phosphazene), poly(bis(2,2,2-trifluoroethoxy)phosphazene), poly(bis(4-(ethoxy carbonyl)phenoxy)phosphazene, or a combination of any two or more thereof;
  the phosphazene base is tert-butylimino-tri(pyrrolidino)phosphorane, tert-octylimino-tris(dimethylamino)phosphorane, or a combination thereof;
  the fluorinated ester is methyl perfluorooctanoate, dimethyl tetrafluorosuccinate, dimethyl hexafluoroglutarate, dimethyl octafluoroadipate, ethylperfluorobutyrate, or a combination of any two or more thereof;
  the fluorinated ether is 1,1,1,2,2,3,3-heptafluoro-3-methoxypropane, ethoxynonafluorobutane, 1,1,1,2,2,3,4,5,5,5-decafluoro-3-methoxy-4-(trifluoromethyl)pentane, or a combination of any two or more thereof;
  the fluorinated electrolyte salt is tetraethylammonium hexafluorophosphate, lithium hexafluorophosphate, lithium bis(trifluoromethanesulfonyl)imide, tetrabutylammonium hexafluorophosphate, tetraethylammonium tetrafluoroborate, or a combination of any two or more thereof; and
  the fluorinated poly(ethylene glycol) comprises 1H,1H,8H,8H-perfluoro-3,6-dioxaoctane-1,8-diol.

2. The electrochromic device of claim 1, wherein the polyisocyanate comprises HDT (trimer of hexamethylene diisocyanate), polymethylene polyphenylisocyanate, toluene diisocyanate, methylene diphenyl diisocyanate, or a combination of any two or more thereof.

3. The electrochromic device of claim 1, wherein the flame-retardant agent comprises an aromatic phosphate, a cyclic phosphazene compound, a polymeric phosphazene compound, a phosphazene base, a fluorinated ester, or a combination of any two or more thereof.

4. An electrochromic device comprising:
- a sealing member comprising a first flame-retardant additive selected from the group consisting of a metal hydroxide, a melamine polyphosphate, a metal salt of a dialkyl phosphinate, an aromatic phosphate, and a combination of any two or more thereof;
- a chamber defined by a first conductive surface of a first substrate, a second conductive surface of a second substrate, and the sealing member joining the first substrate to the second substrate; and
- an electrochromic medium disposed within the chamber and comprising at least one cathodic electroactive material;
- wherein:
  - the electrochromic device is an electrochromic aircraft transparency.

5. The electrochromic device of claim 4, wherein the electrochromic medium further comprises a second flame-retardant additive.

6. The electrochromic device of claim 5, wherein the second flame-retardant additive is the same as or different from the first flame-retardant additive.

* * * * *